May 2, 1950    J. M. THOMAS    2,506,251
SPHERICAL CALCULATOR
Filed Feb. 26, 1945    2 Sheets-Sheet 1
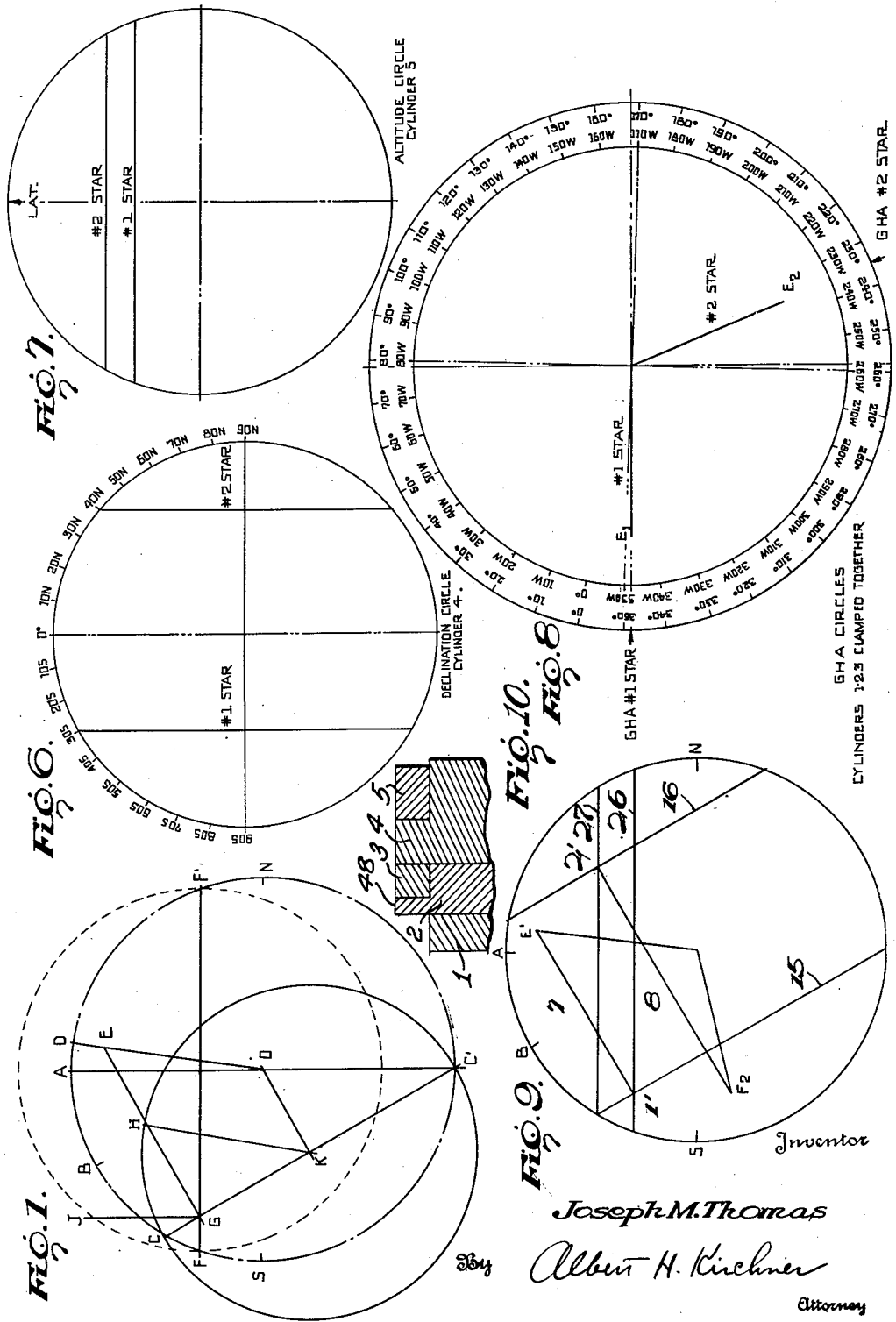
Inventor
Joseph M. Thomas
By Albert H. Kirchner
Attorney May 2, 1950          J. M. THOMAS          2,506,251
SPHERICAL CALCULATOR
Filed Feb. 26, 1945          2 Sheets—Sheet 2
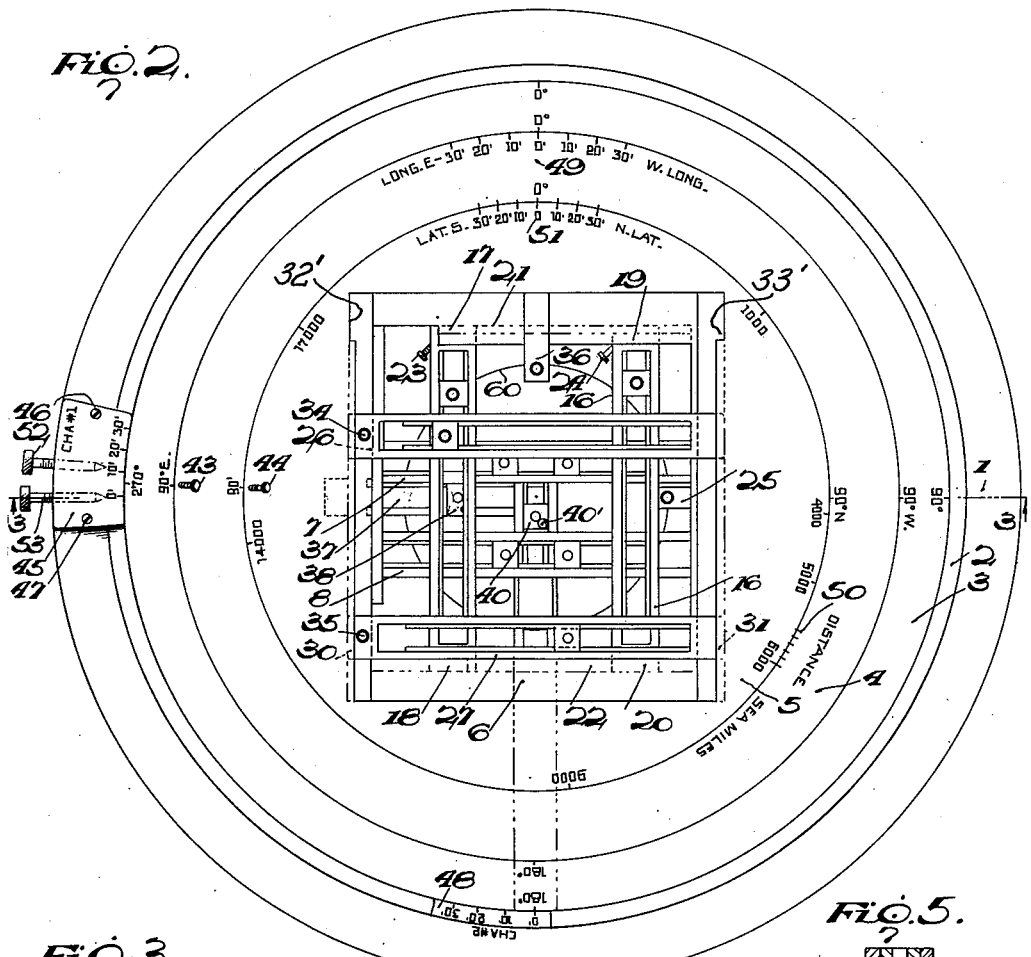
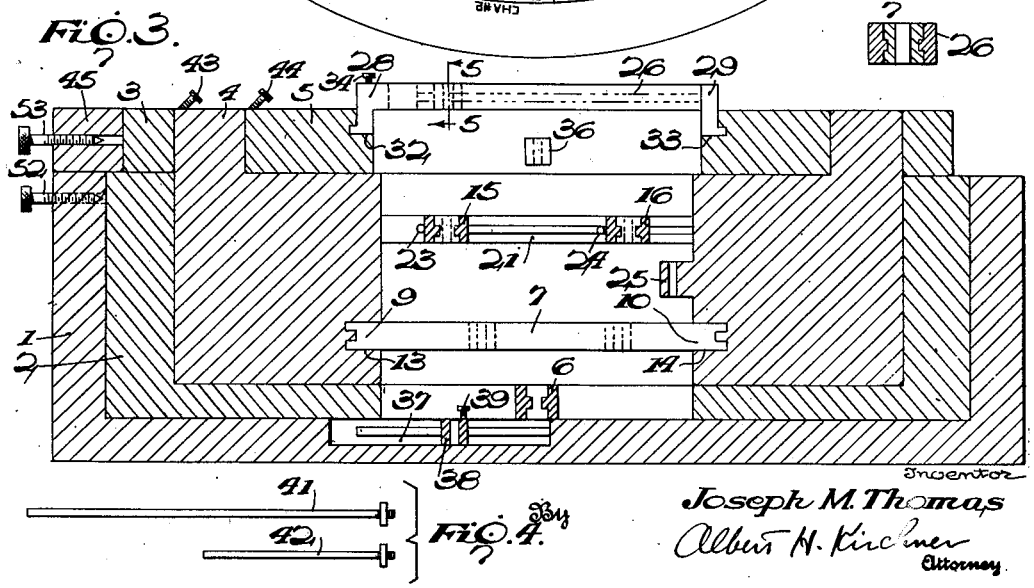
Inventor
Joseph M. Thomas
By Albert H. Kirchner
Attorney Patented May 2, 1950

2,506,251

UNITED STATES PATENT OFFICE 2,506,251

SPHERICAL CALCULATOR

Joseph Miller Thomas, Durham, N. C.

Application February 26, 1945, Serial No. 579,840

3 Claims. (Cl. 33—1)

This invention relates to calculating devices and more particularly to an apparatus for use in celestial navigation for determining the position of a ship, airplane or the like.

More specifically this invention has as its object to provide an instrument capable of calculating directly the latitude and longitude of a given point on the terrestrial sphere from the Greenwich hour angle, declination and altitude of two points on the celestial sphere observed simultaneously from the given point.

For the great circle track between two points whose latitude and longitude are given the instrument of this invention can be used to calculate directly the spherical distance in miles and the latitude and longitude at any distance along the track and can be adapted to calculate the azimuth of a point on the celestial sphere, the course at any distance on the great circle track, or the unknown parts of any spherical triangle.

Other objects of this invention will appear from the following description and drawings illustrating this invention wherein:

Figure 1 is a diagrammatic construction illustrating the basic principles of this invention.

Figure 2 is a plan view of an embodiment of a calculating device according to this invention.

Figure 3 is a sectional view taken on line 3—3 of Figure 2.

Figure 4 is an elevational view showing the appearance of the securing pins used in the calculating device of Figure 2.

Figure 5 is a cross-sectional view taken on line 5—5 of Figure 3.

Figure 6 is a partial schematic view showing the declination circle diagram obtained from the values of declination of two stars used in determining the latitude and longitude from the device of this invention.

Figure 7 is a partial schematic view similar to Figure 6 but showing the altitude circle diagram.

Figure 8 is a partial schematic view showing the circle diagram corresponding to settings of the GHA arms for the stars of Figures 6 and 7.

Figure 9 is a schematic view representing the final closure of the linkage formed by the various arms whereby latitude and longitude can be read off the instrument.

Figure 10 is a vertical sectional detail view taken radially through the second GHA vernier of the device of Figure 2.

Referring to Figure 1, a geometrical construction is disclosed wherein the paper represents the plane of the meridian viewed from the east. The meridian is represented by the circle with center at O defined by points A, D, F', N, C', S, F, C and B. CC' is the diameter of a star's diurnal circle which has been rotated through 90° into the plane of the paper. The rotated position of the diurnal circle is the circle CHC'. The point H is the rotated position of the star. Arc CH is therefore the local hour angle. The circle FJF' represents the star's altitude circle rotated 90° into the plane of the paper around the diameter FF'. Arc F'J is therefore the azimuth. If the circles were rotated back into their original positions on the celestial sphere, H and J would coincide since J is the rotated position of the star on the altitude circle. This coincidence would occur in the perpendicular to the paper erected at G. GH is therefore perpendicular to CC'. If GH is prolonged and OD drawn parallel to KH, where K is the center of CC', a point E will be determined as the intersection of GH and OD. Since OE is equal to KH (KHEO being a parallelogram), OE is hence equal to KC, which like KH, is a radius of circle CHC'.

Reference is made to the accompanying Figures 2 and 3. The instrument proper consists of a hollow cylindrical base 1, in which rotate four other cylinders 2, 3, 4 and 5. Cylinder 2 carries radial arm 6 rigidly attached. Cylinder 4 carries: chordal arms 7 and 8 which have grooved ends 9 and 10 sliding in tracks 13 and 14; chordal arms 15 and 16 which have grooved ends 17, 18, 19 and 20 sliding in tracks 21 and 22, and which are set by clamp devices 23 and 24; and aligner 25 rigidly attached. Cylinder 5 carries: chordal arms 26 and 27 which have flanged ends 28, 29, 30 and 31 sliding in tracks 32 and 33 and which are set by clamp devices 34 and 35; and aligner 36 rigidly attached. In the zero position of the cylinder, aligner 25 is at right angles to tracks 32 and 33 and extends parallel to arms 26 and 27.

Base 1 has a groove 37 in which slides carriage 38 set by clamp 39. Arm 6 is similarly equipped with carriage 40 and clamp 40' thereon. Arms 7, 8, 15, 16, 26 and 27 are pierced by slots in which move carriages without fastening devices. Arms 7 and 8 have two carriages each.

Each carriage is pierced by a vertical cylindrical hole. Four pins with collars, two like that shown at 41 in Figure 4 and two like that shown at 42 in Figure 4, are provided. A pin 41 is used to align the carriage of arm 26 (or 27) over aligner 25; or to align the carriage of arm 15 (or 16) under aligner 36; or to align the carriage of arm 26 (or 27) over the carriage of arm 15 (or 16) over a carriage of arm 7 (or 8). A pin 42 is used to align a carriage of 7 (or 8) over carriage 38 (or 40).

Clamp devices 43 and 44 lock 4 to 3 and 5 to 4 respectively and also serve as knobs for turning the cylinders.

The upper face of cylinder 1 carries a vernier 45 which is attached by screws 46 and 47 and which projects over cylinder 2. The upper face of cylinder 2 carries a raised vernier 48. The outer edge of the upper face of cylinder 3 carries the GHA scale graduated clockwise and the inner edge carries the longitude scale graduated clockwise for west and counterclockwise for east. The outer edge of the upper face of cylinder 4 carries the longitude pointer and double vernier 49; the inner edge carries the latitude scale graduated clockwise for north and the distance pointer and vernier 50. The outer edge of the upper face of cylinder 5 carries the latitude pointer and double vernier 51 and the distance scale. (If the distance vernier and scale are rotated through the same angle with respect to the other markings, the zero of the distance scale can be put in a different position.)

Clamp device 52 locks cylinder 1 to cylinder 2 and clamp device 53 locks cylinder 1 to cylinder 3.

On the base 1 is drawn fundamental circle 60, as shown in Figure 2. Its size determines the accuracy. If this circle is five inches in diameter and the instrument is manufactured with the same precision as a good transit, the instrumental error should not exceed one minute.

As described here, the carriages 38 and 40 are permanently marked "1" and "2" respectively; and the carriages on 15 and 16 are likewise marked "1" and "2" respectively. Star No. 2 is accordingly the star with larger declination. The carriages of 7, 8, 26 and 27 may be marked "1" or "2" as required for a particular calculation.

The end portions of the various guide slots or grooves are provided with enlarged open portions permitting the removal or insertion of the carriages and arms. Such enlarged portions are shown, for example, at 32′ and 33′ in Figure 2.

There is a minimum difference of declination, of GHA and of altitude below which the instrument will not function because of interference.

There exist numerous methods for constructing the unknown parts of a spherical triangle by means of drawing instruments applied to a plane sheet of paper, that is, by descriptive geometry. The method most closely related to the theory of the instrument of this invention is given in B. Dutton, "Navigation and Nautical Astronomy," eighth edition, Annapolis, 1943, pp. 212–213. Several modifications and extensions of this theory were necessary in order to devise the present instrument:

(1) The construction must be done in terms of coordinates rather than elements of an Euler triangle. This modification, although easy to make, is of the utmost importance from the standpoint of convenience.

(2) The circles employed must all be concentric.

(3) The solution of the fundamental position is equivalent to the simultaneous solution of three spherical triangles.

It is to be understood that in the accompanying drawings N and W coordinates are to be measured clockwise and that N as applied to altitude means above the horizon. In Figure 1 the circle of unit radius with center at 0 is now considered. From any point A on its circumference lay off arcs $AN$=plus 90°, $AS$=minus 90°. Construct BA equal to the latitude of a point P, BC equal to the declination of a star, SF equal to the altitude of the star as seen from P, arc BD equal to the local hour angle at P, and OE which passes through D and equals one half chord CC′ (that is, equals the cosine of the declination). It is then easy to show from the preceding theoretical discussion that chords CC′, FF′ and the perpendicular from E to CC′ are concurrent in a point G.

If the latitude and longitude of P are not given, from the coordinates of two stars we can construct the three partial diagrams shown in Figures 6, 7 and 8. The solution of the fundamental problem consists in rotating the declination and altitude diagrams until the intersections of corresponding chords coincide with the feet of the perpendiculars from $E_1$, $E_2$ to the declination chords. This is accomplished mechanically as follows: the carriages 38 and 40 on the GHA groove 37 and arm 6 are fastened at the proper distances from the center at $E_1$, $E_2$, as will presently be described, the GHA groove and arm are set at the appropriate angles, as will be presently shown, and the three cylinders 1, 2 and 3 are locked so as to rotate together (Figure 8). One of the carriages on 7 is pinned to the carriage at $E_1$ (or $E_2$) and one of the carriages on 8 is pinned to the carriage at $E_2$ (or $E_1$). As the declination circle (Figure 6) rotates with respect to the GHA circles (Figure 8), arms 7 and 8 are constrained by their carriages to continue to pass through $E_1$ and $E_2$ and by their grooved ends to remain perpendicular to the declination arms 15 and 16. The last mentioned are set in the appropriate position, as will be shown, with respect to the fundamental circle (made in these later drawings to have the same radius as the inner edge of cylinder 4) as shown in Figure 6. The altitude arms 26 and 27 are set, as will be subsequently described, at their appropriate places as shown in Figure 7. The second carriage on arm 7 (say) is pinned at 1′ to the intersection of the star No. 1 altitude arm 26 and star No. 1 declination arm 15 by means of the sliding carriages on those arms. The system is then rotated until the intersection of the star No. 2 altitude arm 27 and star No. 2 declination arm 16 comes over arm 8 at 2′. The mechanism can then be locked in position by pinning through three vertically aligned carriages. Figure 9 shows the final position with pins at 1′ and 2′.

It is clear from Figure 1 that the latitude is the displacement of the zenith A from the point B. It can be read on the declination scale by means of the latitude pointer fixed at A. Similarly, it is clear that the displacement of B from the point D with GHA equal to zero is the longitude and can be read on the longitude scale by the longitude pointer fixed at B.

There are, of course, in general two solutions which must be distinguished (say, by roughly observed azimuth).

The following specific steps show how to operate the calculator:

0. Release all clamps.

1. Set pointer 51 opposite declination of star No. 1. Set clamp 44.

2. Pin socket 36 to the carriage on arm 15 and to one carriage on arm 7. Set clamp 23.

3. Align GHA pointer No. 1 with 0° on cylinder 2 and with pointer 49. Set clamps 43, 53.

4. Pin carriage 38 to the second carriage on arm 7. Set clamp 39.

5. Repeat the above for star No. 2. Specifically:

5.0. Remove pin from 36 and from the carriages on 7 and 15. Release clamps 43, 44, 53.

5.1. Set pointer 51 opposite declination of star No. 2. Set clamp 44.

5.2. Pin socket 36 to carriage on arm 16 and to one carriage on arm 8. Set clamp 24.

5.3. Align GHA pointer No. 2 with 0° on cylinder 3 and with pointer 49. Set clamps 43, 52, 53.

5.4. Pin carriage 40 to the second carriage on arm 8. Set clamp 40'.

5.5. Remove pin from 36 and from the carriages on 8 and 16. Release clamps 43, 44, 52, and 53.

6. Set pointer 51 opposite altitude of star No. 1. Clamp 44.

7. Pin socket 25 to the carriage on arm 26. Clamp 34.

7.1. Remove pin from 25 and from the carriage on 26. Release clamp 44.

8. Set the altitude of star No. 2 as follows:

8.1. Set pointer 51 at the altitude of star No. 2. Clamp 44.

8.2. Pin socket 25 to the carriage on arm 27. Clamp 35.

8.3. Remove pin from 25 and from the carriage on 27. Release clamp 44.

9. Set the GHA pointer No. 1 opposite the GHA of star No. 1 and the GHA pointer No. 2 opposite the GHA of star No. 2. Clamp 52, 53.

10. Bring the arm 26 over the intersection of arms 7 and 15. Align vertically the carriage on arm 26, the unpinned carriage on arm 7, and the carriage on arm 15. Pin the three carriages together.

11. Bring the arm 27 over the intersection of arms 8 and 16. Align vertically the carriage on arm 27, the unpinned carriage on arm 8 and the carriage on arm 16. Pin the three carriages together.

12. Read the latitude by vernier 51 and the longitude by vernier 49.

For the sake of definiteness, it has been assumed that star No. 1 has the algebraically smaller altitude, and the algebraically smaller declination. It is always possible to designate as No. 1 the star with smaller declination. If, however, the star designated as No. 2 has the smaller altitude, the roles of arms 26 and 27 must be interchanged. In other words, arm 7 is always used for the star with the algebraically smaller declination and arm 26 for the star with the algebraically smaller altitude.

Steps 1–2 fasten arm 15 (No. 1 star) to cylinder 4, and steps 5.1–5.2 fasten arm 16 (No. 2 star) to cylinder 4, realizing the situation shown in Figure 6.

Steps 3–4 fasten carriage 38 to cylinder 1 at the radial position $E_1$ in Figure 8. Steps 5.3–5.4 fasten carriage 40 to cylinder 2 at the radial position $E_2$ in Figure 8.

Steps 3–4 at the same time constrain arm 7, which is always perpendicular to arm 15, henceforth to pass over $E_1$. Steps 5.3–5.4 at the same time constrain arm 8, which is always perpendicular to arm 16, henceforth to pass over $E_2$.

Steps 6–7 fasten arm 26 (No. 1 star) to cylinder 5, and steps 8.1–8.2 fasten arm 27 (No. 2 star) to cylinder 5, realizing the situation shown in Figure 7.

Step 9 sets and clamps cylinders 1, 2 and 3 in their final relative positions shown in Figure 8.

Henceforth there are essentially just the three cylinders shown in Figures 6, 7 and 8. If the unit composd of cylinders 1, 2 and 3 is regarded as fixed, during steps 10 and 11 cylinders 4 and 5 rotate with respect to that unit. It is unnecessary to specify how the rotation takes place. The theory developed in connection with Figures 1 and 9 shows that the motion is possible. If the parts of the instrument are accurately machined, the cylinders will follow the motion of the arms 26 and 27 without difficulty.

Step 10 makes the lines representing arms 7, 15 and 26 pass through a point and continue to do so. The point of intersection moves, in step 11, until it reaches the final position 1' in Figure 9.

Step 11 makes the lines representing arms 8, 16 and 27 pass through 2' in Figure 9 and locks the whole mechanism by pinning through the three carriages.

While certain specific embodiments of this invention have been shown and described herein it will be understood that various additional modifications may be made within the spirit of the invention. Therefore no limitations upon the invention are intended other than are imposed by the scope of the appended claims.

I claim:

1. In a calculator for solving spherical triangles wherein the coordinates of two points of the triangle are known and it is desired to determine the coordinates of the third point, a plurality of nested members means constraining said nested members for mutual rotation about a common axis, said nested members being provided with measuring scales, a free linkage system having elements which are adjustable in length and direction and are operatively connected to the nested members for such adjustment, means for adjusting the linkage elements in accordance with the coordinates of the two known points of the triangle as measured on said scales, a free carriage slidably mounted on one linkage element, and means for rotating the nested members to an indicating position at which said free carriage is in registry with the intersection of two other linkage elements whereby the linkage may be locked by pinning through at the point of registry.

2. In a calculator, a cylindrical outer cup-shaped member, a radial groove in the inner bottom surface of said cup-shaped member, a second cylindrical cup-shaped member rotatably fitting within the outer member, a central aperture in the bottom wall of said second member, a radial arm carried by said bottom wall in said aperture, a carriage slidably fitting said groove for radial adjustment thereon, another carriage slidably fitting said radial arm for radial adjustment thereon, a third cylindrical cup-shaped member rotatably fitting within said second member, a rectangular central aperture in said third member, a pair of horizontal guide tracks formed in a first two opposing walls of said rectangular aperture, a first pair of arms slidably fitting said guide tracks and bridging said first two opposing walls, means constraining said first pair of arms to perpendicular positions with respect to said first two opposing walls, a pair of horizontal guide tracks formed in the other two opposing walls of the rectangular aperture, another pair of arms slidably fitting the horizontal guide tracks in said other two opposing walls, means constraining said another pair of arms to perpendicular positions with respect to said other two opposing walls, a cylindrical disc element rotatably fitting within said third cup-shaped member, a rectangular central opening formed in said disc element, a pair of horizontal guide tracks formed in two opposing walls of said opening, a pair of bridging elements slidably fitting the tracks in the opposing walls of said opening, means constraining the bridging elements to perpendicular positions with respect to the said opposing walls of the opening, means for pivotally locking one of said first pair of arms to the carriage in said radial groove, means for pivotally locking the other of said first pair of arms to the carriage on said radial arm, means for locking one of the bridging elements, one of the arms in said other two opposing walls and one of the arms in said first two opposing walls in superimposed relationship, and means for locking the other of the bridging elements, the other of the arms in said other two opposing walls and the other of the arms in said first two opposing walls in superimposed relationship.

3. The structure of claim 2, and wherein the rim of the third cup-shaped member projects above the level of the rim of the second cup-shaped member, and wherein a ring member is provided, said ring member being formed to rotatively fit around the outer periphery of the rim of the third cup-shaped member and to rotatively bear on the top of the rim of the second cup-shaped member.

JOSEPH MILLER THOMAS.

REFERENCES CITED

The following references are of record in the file of this patent:

UNITED STATES PATENTS

| Number | Name | Date |
| --- | --- | --- |
| 1,770,461 | Cogshall | July 15, 1930 |
| 2,105,103 | Switzin-White | Jan. 11, 1938 |
| 2,378,981 | Chamberlin | June 26, 1945 |
| 2,421,965 | Sa Pereira | June 10, 1947 |

FOREIGN PATENTS

| Number | Country | Date |
| --- | --- | --- |
| 946 | Great Britain | Apr. 3, 1866 |
| 543,886 | Great Britain | Mar. 18, 1942 |